US011755216B2

(12) United States Patent
Scharland et al.

(10) Patent No.: US 11,755,216 B2
(45) Date of Patent: Sep. 12, 2023

(54) CACHE MEMORY ARCHITECTURE AND MANAGEMENT

(71) Applicant: Dell Products L.P., Round Rock, TX (US)

(72) Inventors: Michael Scharland, Franklin, MA (US); Mark Halstead, Holliston, MA (US); Rong Yu, West Roxbury, MA (US); Peng Wu, Westborough, MA (US); Benjamin Yoder, Chandler, AZ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/586,901

(22) Filed: Jan. 28, 2022

(65) Prior Publication Data

US 2023/0021424 A1    Jan. 26, 2023

Related U.S. Application Data

(63) Continuation-in-part of application No. 17/385,257, filed on Jul. 26, 2021, now Pat. No. 11,599,461.

(51) Int. Cl.
*G06F 12/00* (2006.01)
*G06F 3/06* (2006.01)
*G06F 12/02* (2006.01)
*G06F 12/0831* (2016.01)

(52) U.S. Cl.
CPC .......... *G06F 3/0635* (2013.01); *G06F 3/0613* (2013.01); *G06F 3/0659* (2013.01); *G06F 3/0683* (2013.01); *G06F 12/0246* (2013.01); *G06F 12/0833* (2013.01)

(58) Field of Classification Search
CPC .... G06F 12/0802; G06F 12/10; G06F 12/128; G06F 13/20; G06F 2212/72
See application file for complete search history.

(56) References Cited

U.S. PATENT DOCUMENTS

| 9,842,060 B1* | 12/2017 | Jannyavula Venkata .................... G06F 12/0871 |
| 2019/0377681 A1* | 12/2019 | Hodes ................. G06F 12/0848 |
| 2022/0138105 A1* | 5/2022 | Bora .................... G06F 12/0813 711/154 |

* cited by examiner

*Primary Examiner* — Shawn X Gu
(74) *Attorney, Agent, or Firm* — Krishnendu Gupta; Nikhil Patel

(57) ABSTRACT

Aspects of the present disclosure relate to data cache management. In embodiments, a logical block address (LBA) bucket is established with at least one logical LBA group. Additionally, at least one LBA group is associated with two or more distinctly sized cache slots based on an input/output (IO) workload received by the storage array. Further, the association includes binding the two or more distinctly sized cache slots with at least one LBA group and mapping the bound distinctly sized cache slots in a searchable data structure. Furthermore, the searchable data structure identifies relationships between slot pointers and key metadata.

20 Claims, 7 Drawing Sheets

CACHE MEMORY ARCHITECTURE AND MANAGEMENT

RELATED APPLICATION(S)

This application is a continuation-in-part of U.S. application Ser. No. 17/385,257, filed on Jul. 26, 2021. Accordingly, the entire teachings of the above application(s) are incorporated herein by reference.

BACKGROUND

A storage array is a data storage system that includes multiple storage drives (e.g., hard disk drives (HDDs), solid-state drives (SSDs)), and memory such as random-access memory (RAM) or dynamic RAM (DRAM). Storage array system allows the separation of data storage from computing devices. The break of data storage from computing devices enables multiple users to collaborate and share information in a scalable manner. A storage array can include a storage and memory management system that controls data storage and access to the array's storage drives and memory. In addition, the storage and memory management system can have an operating system that manages a storage array's memory, processes, software, hardware, and communications.

SUMMARY

Aspects of the present disclosure relate to data cache management. In embodiments, a logical block address (LBA) bucket is established with at least one logical LBA group. Additionally, at least one LBA group is associated with two or more distinctly sized cache slots based on an input/output (IO) workload received by the storage array. Further, the association includes binding the two or more distinctly sized cache slots with at least one LBA group and mapping the bound distinctly sized cache slots in a searchable data structure. Furthermore, the searchable data structure identifies relationships between slot pointers and key metadata In embodiments, IO workload-related IO requests that include dirty data payloads can be identified.

In embodiments, whether the storage array has previously stored a version of an IO request's data payload on a persistent storage device can be determined. Additionally, each data payload without a previously stored version can be identified as dirty.

In embodiments, the searchable data structure can store dirty data using an ordering schema that positionally identifies a newest write IO request's dirty data.

In embodiments, the searchable data structure can store non-dirty data using a storage schema that is at least one of: positionally opposite to the dirty data and unordered.

In embodiments, a data search schema can be based on the dirty data ordering scheme.

In embodiments, a search can be performed to determine whether a newly receiving IO request's data is dirty or non-dirty using the data search schema.

In embodiments, an initial storage array resource profile can be generated based on the storage array's intended use characteristics. The cache memory can be provisioned with the one or more sets of distinctly sized cache slots using the initial storage array resource profile.

In embodiments, one or more cache slot pools can be established. In addition, each cache slot's attributes can be determined. Further, one or more cache slot pools can be established based on the determined cache slot attributes and current/historical IO workloads the storage array receives.

In embodiments, one or more IO workload patterns or IO request patterns can be identified based on the analyzed IO request characteristics. Additionally, one or more IO workload models can be established based on the identified patterns. Further, one or more cache slot pools can be established based on predicted IO request characteristics defined by the IO workload models and each cache slot's memory type.

DETAILED DESCRIPTION

Organizations often use decentralized storage array solutions to store and manage their data. A storage array can include multiple storage drives such as hard disk drives (HDDs) or solid-state drives (SSDs). However, not all storage drives are created equal and have different performance characteristics (e.g., time taken to complete a storage request). For example, an organization can issue large data request volumes to a storage array during a business day. The data requests can correspond to a read/write request. Further, a high frequency of data requests can be related to specific data objects (e.g., high-demand files or applications).

Accordingly, the arrays can include memory controllers that temporarily store copies of high-demand data in the array's fast-access memory (e.g., global memory) with significantly greater performance characteristics than HDDs or SSDs. Unfortunately, current memory controllers use naïve memory management techniques to establish statically sized cache slots, resulting in inefficient memory utilization. For example, the array's memory can include 128 KB-sized cache slots (128 KB cache slot). Consequently, a memory controller can use a 128 KB cache slot to store an 8 KB high-demand data object. Thus, the memory controller has inefficiently allocated 120 KB of cache memory to store an 8 KB data object.

As disclosed in greater detail herein, embodiments of the present disclosure relate to cache memory management techniques that can establish variably sized cache slot pools. For example, the embodiments disclosed herein can assign each logical block address (LBA) in an LBA group (e.g., range) with distinctly sized cache slots (e.g., 64 KB, 16 KB, or 8 KB). For example, the embodiments can establish predictive IO workload models that anticipate IO request sizes. The embodiments can dynamically allocate one or more LBAs in a group with a distinctly sized cache slot based on the predicted IO request sizes. For instance, the embodiments can perform the allocations as a function of a current workload's IO request sizes. Further, the embodiments can dynamically rebalance or re-allocation variably sized cache slots and LBA mappings based on an anticipated (e.g., next/future) IO workload's IO request sizes.

Figure 1:
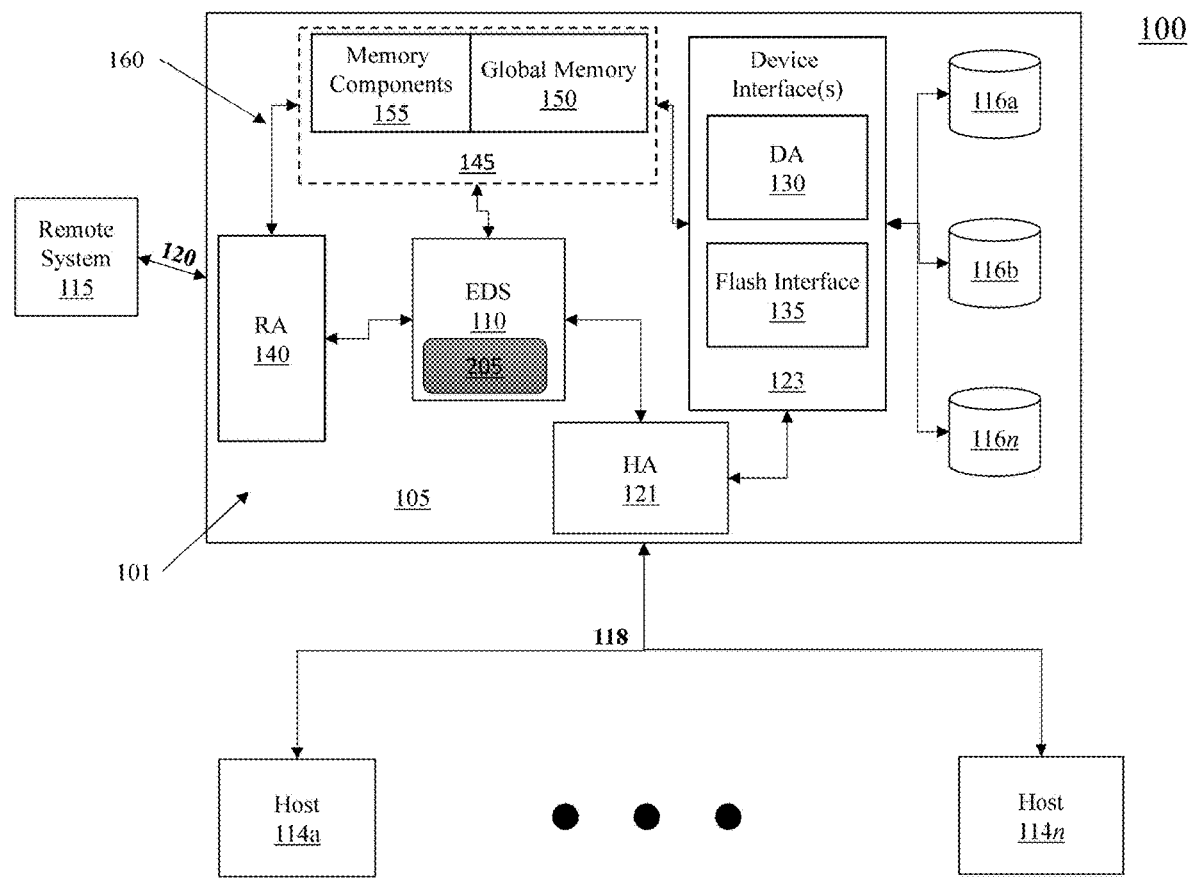
FIG. 1 is a block diagram of a storage array in accordance with embodiments of the present disclosure.

Regarding FIG. 1, a system 100 includes a storage array 105 that includes components 101 configured to perform one or more distributed file storage services. In embodiments, the array 105 can include one or more internal communication channels 160 that communicatively couple each of the array's components 101. The communication channels 160 can include Fibre channels, internal busses, or communication modules. For example, the array's global memory 150 can use the communication channels 160 to transfer data or send other communications between the array's components 101.

In embodiments, the array 105 and one or more computing devices such as hosts 114a-n can form a network such as a wide area network (WAN) (e.g., Internet), local area network (LAN), intranet, Storage Area Network (SAN)), and the like. For example, the array can include a host adapter (HA) 121, having hardware/circuitry or logic/software architecture that interfaces with and connects the array 105 to a first communications network 118. Thus, the first communication network 118 communicatively couples the array 105 to one or more devices connected to the first network 118 (e.g., the host systems 114a-n). Likewise, a second communication network 120 can allow the array 105 to communicate with a remote system 115, having a second network connection. For instance, the array 105 can include a remote adapter (RA) 140, having hardware/circuitry or logic/software architecture that interfaces with and connects the array 105 to the second network 118. Accordingly, the first and second networks 118, 120 can interconnect devices to form a network of devices (networked devices).

In further embodiments, the array 105 and networked devices like the hosts 114a-n and the remote system 115 can send/receive information (e.g., data requests) using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

The array 105, remote system 116, hosts 115a-n, and the like can connect to the first or second networks 118, 120 via a wired/wireless network connection interface, bus, data link, and the like. Further, the first and second networks 118 120 can also include communication nodes that enable the networked devices to establish communication sessions. For example, communication nodes can include switching equipment, phone lines, repeaters, multiplexers, satellites, and the like. Thus, the communications protocol can also comprise rules or policies the networked devices use to navigate and exchange messages over the network.

In embodiments, the array's components 101 can process input/output (IO) workloads. An IO workload can include one or more IO requests (e.g., operations) originating from the hosts 114a-n. The hosts 114a-n and the array 105 can be physically co-located or located remotely from one another. In embodiments, an IO request can include a read/write request. For example, an application executing on one of the hosts 114a-n can issue data requests to the array 105. Furthermore, the IO workload can correspond to IO requests from the hosts 114a-n over a period (e.g., time interval).

In embodiments, the array 105 and remote system 115 can include any single or multi-processor system architectures designed to perform storage-related services. Likewise, the array's components 101 (e.g., HA 121, RA 140, device interface 123, and the like) can include physical/virtual computing resources (e.g., a processor and memory) with architectures designed to perform one or more storage service aspects. Thus, for example, the array 105 can have local memory 145 that includes instructions the processor systems can execute to perform one or more storage array operations.

In embodiments, the HA 121 comprises a Fibre Channel Adapter (FA) that manages communications and data requests between the array 105 and any networked device (e.g., the hosts 114a-n). For example, the HA 121 can direct one or more IOs to at least one component 101 for further storage processing. In embodiments, the HA 121 can direct an IO request to the array's device interface 123. The device interface 123 can manage the IO request's read/write data operation requiring access to the array's data storage devices 116a-n. For example, the data storage interface 123 can include a device adapter (DA) 130 (e.g., storage device controller), flash drive interface 135, and the like that controls access to the storage devices 116a-n. Likewise, the array's Enginuity Data Services (EDS) processor 110 can manage access to the array's local memory 145. In additional embodiments, the array's EDS 110 can perform one or more self-optimizing techniques (e.g., one or more machine learning techniques) to deliver performance, availability, and data integrity services for the array 105 and its components 101.

In embodiments, the array's storage devices 116a-n can include one or more data storage types, each having distinct performance capabilities. For example, the storage devices 116a-n can include a hard disk drive (HDD), solid-state drive (SSD), and the like. Likewise, the array's local memory 145 can include global memory 150 and memory components 155 (e.g., register memory, shared memory constant memory, user-defined memory, and the like). The array's memory 145 can include primary memory (e.g., memory components 155) and cache memory (e.g., global memory 150). The primary memory and cache memory can be volatile or nonvolatile memory. Unlike nonvolatile memory, volatile memory requires power to store data. Thus, volatile memory loses its stored data if the array 105 loses power for any reason. In embodiments, the primary memory can include dynamic (RAM) and the like, while cache memory can include static RAM. Like the array's storage devices 116a-n, the array's memory 145 can have different storage performance capabilities.

In embodiments, a service level agreement (SLA) can define at least one Service Level Objective (SLO) the hosts 114a-n expect the array 105 to achieve. For example, the hosts 115a-n can include host-operated applications. The host-operated applications can generate and issue the corresponding read/write IO requests to the array 105 to store or read its stored data. In addition, the hosts 114a-n can assign different levels of business importance to data types they produce or require. Thus, each SLO can define a service level (SL) for each data type the hosts 114a-n write to or read from the array 105. Further, each SL can specify the host's expected storage performance requirements (e.g., a response time and uptime) for one or more data types.

Accordingly, the array's EDS 110 can establish a storage/memory hierarchy based on one or more of the SLA and the array's storage/memory performance capabilities. For example, the EDS 110 can establish the hierarchy to include one or more tiers (e.g., subsets of the array's storage/memory) with similar performance capabilities (e.g., response times and uptimes). Thus, the EDS-established fast memory/storage tiers can service host-identified critical and valuable data (e.g., Platinum, Diamond, and Gold SLs), while slow memory/storage tiers service host-identified non-critical and less valuable data (e.g., Silver and Bronze SLs).

In embodiments, the HA 121 can present the hosts 114a-n with logical representations of the array's physical storage devices 116a-n and memory 145 rather than expose their respective physical address spaces. The logical storage representations can correspond to an entire storage device 116a-n or one or more slices/portions of the storage device(s) 116a-n (e.g., address spaces, tracks, or sectors). For example, the EDS 110 can generate and assign each address space with a logical block address (LBA). Further, the EDS 110 can logically group LBAs to define a storage space, having a size consistent with a storage device track's length. Thus, the EDS 110 can generate and assign each LBA group with a unique track ID (TID). Furthermore, the EDS 110 can establish TID groups and give each group a unique logical unit number (LUN).

In embodiments, the HA 121 can represent each LUN as a virtual storage device. Accordingly, the hosts 114a-n can include a LUN, TID, LBA (e.g., virtual storage representations) in each IO request's metadata. Specifically, each IO request's metadata can have storage-related fields to which the hosts 114a-n can insert virtual storage information. Additionally, the EDS 110 can create and store, in memory 145, a searchable IO routing data structure (e.g., the look-up table 315 of FIG. 3) that associates each disk's corresponding physical storage locations with their respective virtual (e.g., logical) representations in the memory 145. Thus, the array's HA 121 can direct IO requests to their target physical storage location(s) by using the storage-related metadata fields to query the IO routing data structure 315. Additionally, the array's DA 130 can dynamically generate a virtual storage identifier representing an available physical storage space in response to the HA 121 receiving an IO request with empty storage-related metadata fields.

Further, the array's EDS 110 can perform one or more memory management operations to deliver performance, availability, and data integrity services for the array 105 and its components 101. For example, the EDS 110 can also include a memory controller 205 that establishes variably sized cache slot pools. For example, the memory controller 205 can create a logical 128 KB cache slot using a plurality of smaller-sized cache slots (e.g., 64 KB, 16 KB, or 8 KB). Additionally, the memory controller 205 can dynamically allocate (e.g., balance) the variably sized cache slots to one or more logical block addresses (LBAs)). Further, the memory controller 205 can dynamically balance the variably-size cache slot allocations based on one or more historical, current, or anticipated IO workloads and their respective characteristics, as disclosed in greater detail in the following paragraphs.

Figure 2:
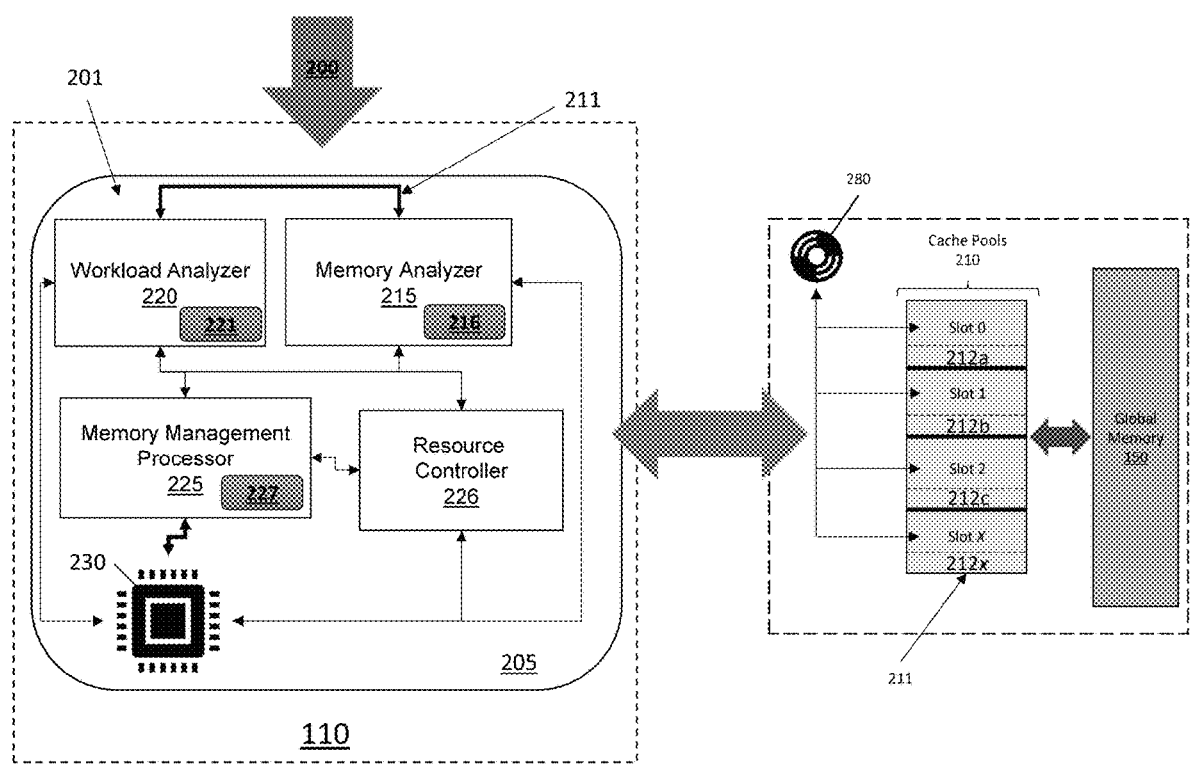
FIG. 2 is a block diagram of a memory controller in accordance with embodiments of the present disclosure.

Regarding FIG. 2, the array's EDS 100 can manage the array's memory 145, including global memory 150. For example, the EDS 110 can have a memory controller 205 that comprises one or more hardware/circuitry or software/logic elements 201 having an architecture designed to manage and dynamically adjust allocations of the global memory 150.

In embodiments, one or more of the memory controller's elements 201 can reside in one or more of the array's other components 101. Further, the memory controller 205 and its elements 201 can be any commercially available processor, such as a single or multiple core central processing unit (CPU) or graphical processing unit (GPU). Additionally, the memory controller 205 can have internal communication channels 211 that enable inter-component communications. For example, the channels 211 can comprise Fibre channels, internal busses, or communication modules.

In embodiments, the memory controller 205 includes a resource controller 226 that provisions the global memory's cache memory 211 into one or more cache memory pools 210. For example, the resource controller 226 can establish each cache memory pool 210 with distinctly sized cache slots 0-X Specifically, the resource controller 226 can segment the cache memory 211 into variable-sized cache slots. For instance, the resource controller 226 can segment the cache memory 211 into pools 210 (e.g., cache pools A-C of FIG. 3), each having distinctly sized cache slots. For example, cache pool A can have size-A cache slots 0-M; cache pool B can have size-B cache slots 0-N; cache pool C can have size-C cache slots 0-P. Furthermore, the size-A, size-B, and size-C cache slots can have, e.g., an 8 KB, 16 KB, 28 KB, 64 KB, or 128 KB bit-length.

In embodiments, the resource controller 226 can predetermine the cache slot sizes based on a host-identified use of the array 105. In other embodiments, the resource controller 226 can also dynamically determine the cache slot sizes based on historical, current, or predicted IO workload characteristics (e.g., an amount or frequency of each workload's IO request sizes). For example, the memory controller 205 can include a workload analyzer 220 that monitors and analyzes historical, current, or predicted IO workloads 200 and their respective IO requests the array 105 receives from hosts 114a-n. For instance, the workload analyzer 220 can extract each IO request's metadata (e.g., IO metadata) to identify IO workload or IO request patterns. For example, the IO metadata can include IO request parameters (IO parameters) such as IO sizes, target LBAs, performance requirements (e.g., response times), payload information, timestamps, amongst other related IO parameters. Additionally, the IO parameters can identify each request's IO type (e.g., read or write request). The workload analyzer 220 can further maintain records of the IO metadata in a searchable IO parameter data structure.

In embodiments, the workload analyzer 220 can include a machine learning (ML) engine 221 having a self-learning logic or circuitry configuration that processes the IO metadata. Then, the ML engine 221 can create one or more predictive IO workload models using the IO parameters. The self-learning logic or circuitry architecture can have a recurring neural network (RNN) design consistent with a Long Short-Term Memory (LSTM) network. Accordingly, the ML engine 221 can process the IO parameters through an RNN thread to identify the IO workload or IO request patterns. The LTSM can generate predictive IO workload models based on historical/current IO workload input parameters.

Furthermore, each IO workload model can correspond to a specific time frame (e.g., time of day, day, week, month, etc.). Additionally, each IO workload model can identify LBAs or their corresponding storage address spaces that future IO requests are likely to access. The workload analyzer 220 can store the searchable IO metadata data structure with the IO workload models in the memory controller's local memory 230.

In other embodiments, the memory controller 205 can include a memory analyzer 215 that can monitor cache memory to determine and establish the variably sized cache slot pools 210 dynamically. For example, the memory controller 205 can monitor the cache memory's activity levels (e.g., amount and frequency of data access requests). For instance, the array 105 can include daemons 280 that communicatively couple to the array's global memory 150, cache memory 211, cache slot pools 210, or the cache slots 0-X, via, e.g., a Fibre channel 160 of FIG. 1. Further, the daemon 280 can record memory-related activity event records in their respective memory activity logs. Each record can include information identifying the related cache slot. Additionally, the information can identify device characteristics such as read/write data type, data size, memory slot size, read/write performance, SL requirement, and telemetry data, amongst other memory-related metadata. For example, the read/write performance can correspond to the memory's response time to service each related IO read/write request.

In embodiments, the memory analyzer 215 can generate one or more memory activity snapshots by periodically analyzing each daemon's activity. Further, the memory analyzer 215 can store the snapshots and activity logs in the memory controller's local memory 230. In other embodiments, the daemons 280 can randomly or periodically issue activity log reports to the memory analyzer 215. For example, the memory analyzer 215 can generate a daemon reporting schedule that defines each daemon's memory activity-event collection period's duration, start time, or end time. For example, the memory analyzer 215 can establish the reporting schedules using the IO workload models stored in the local memory 230. Specifically, the memory analyzer 215 can dynamically adjust the frequency of the snapshot periods based on one or more of the IO workload models' predicted IO workload volumes.

In addition, the memory analyzer 215 can generate memory snapshot heatmaps by analyzing one or more of the activity snapshot's associated memory activity logs. For example, the memory analyzer 215 can perform a histogram-like snapshot memory analysis to identify relative memory activity levels of the cache memory slots 0-X. Further, the memory analyzer 215 can calculate IO access rates (e.g., IOPS) for each cache memory slot 0-X.

Based on the activity level amounts or IOPS, the memory analyzer 215 can define, e.g., hot and cold activity thresholds. Suppose, for example, a cache slot's related activity level or IOPs meets or exceeds the hot activity threshold. In that case, the memory analyzer 215 can classify the cache slot as having high demand (e.g., "hot"). Conversely, suppose a cache slot's related activity level or IOPs falls below the cold activity threshold. Then, the memory analyzer 215 can classify the cache slot as having low demand (e.g., "cold"). Further, the memory analyzer 215 can store each snapshot's related heatmap in local memory 230.

In embodiments, the memory analyzer 215 can include a memory access ML engine 216 that generates one or more predictive memory access models. For example, the memory access ML engine 216 can have a similar architecture as the workload analyzer's ML engine 221. Thus, the memory access ML engine 216 can generate the predictive memory access models using historical or current snapshots' corresponding heatmap(s). Further, the memory analyzer 215 can identify whether a data request corresponds to a dirty LBA. For example, the memory analyzer 215 can identify any modification to an LBA's related data that does not include a disk copy using the memory access activity logs or snapshots. Furthermore, the memory analyzer 215 can provide the LBA with a dirty/clean indicator in such circumstances. For example, each LBA's corresponding cache slot(s) 0-X can include a bitmask 212a-x that the memory analyzer 215 can set to provide a dirty/clean LBA indication (e.g., adjusting a bit from '1' to '0' or vice-versa).

In embodiments, the memory controller 205 can include a memory management processor 225 that can dynamically balance LBA cache slot allocations as described in greater detail in the following paragraphs.

Figure 3:
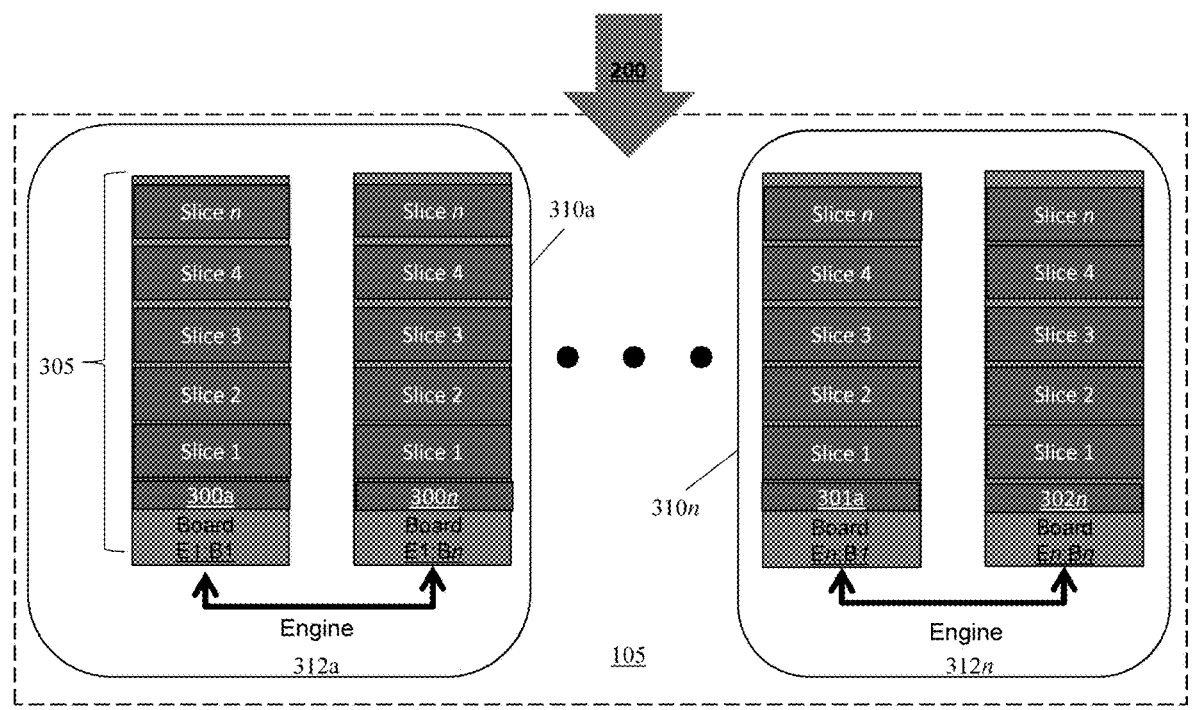
FIG. 3 is a block diagram of a storage array's director boards in accordance with embodiments of the present disclosure.

Regarding FIG. 3, the storage array 105, in embodiments, can include engines 312a-n that deliver storage services. Each engine 312a-n can have hardware circuitry or software components required to perform the storage services. Additionally, the array 105 can house each engine 312a-n in one or more of its shelves (e.g., housing) 310a-n that interface with the array's cabinet or rack (not shown).

In embodiments, each engine 312a-n can include director boards (boards) E1:B1-E1:Bn, En:B1-En:Bn. The boards E1:B1-E1:Bn, En:B1-En:Bn can have slices 305 comprising hardware or software elements that perform specific storage services. For instance, each board's slices 1-n can correspond to or emulate one or more of the storage array's components 101 described in FIG. 1. For example, a board's slice can emulate the array's HA 121 or EDS 110. Additionally, the slices 1-n can emulate one or more of the array's other components 101. Further, the boards B1-n can include memory 300a-n-301a-n, respectively. The memory 300a-n-301a-n can include cache memory 211 of FIG. 2 that has, e.g., a dynamic random-access memory (DRAM) architecture.

In embodiments, each board's emulated memory controller 205 can provision its respective board with one or more portions of the global memory's cache memory 211 of FIG. 2. For example, the memory controller 205 can uniformly carve out at least one global memory section into x-sized memory portions 300a-n-301a-n. Further, the memory controller 205 can dynamically establish and balance cache memory pools 210 from the x-sized memory portions 300a-n-301a-n using one or more predictive IO workload models (e.g., based on expected IO sizes) stored in local memory 230.

In embodiments, the array 105 can receive one or more IO workloads 200 via an HA 121 residing or emulated on one or more of the boards B1-n. As described in FIG. 1 above, the HA 121 can present the hosts 114a-n with logical representations of the array's physical storage devices 116a-n. In addition, the HA 121 can provide hosts 114a-n with physical or logical port addresses corresponding to its respective ports (e.g., of ports 322 of FIG. 3). Accordingly, the hosts 114a-n can include the physical or logical port address in each IO request's metadata. Specifically, each IO request's metadata can have one or more routing fields in which the hosts 114a-n can insert the physical or logical port addresses. Thus, the workload analyzer 215 can add the port routing information to the IO parameter data structure, as FIG. 2 describes above in greater detail.

Figure 3A:
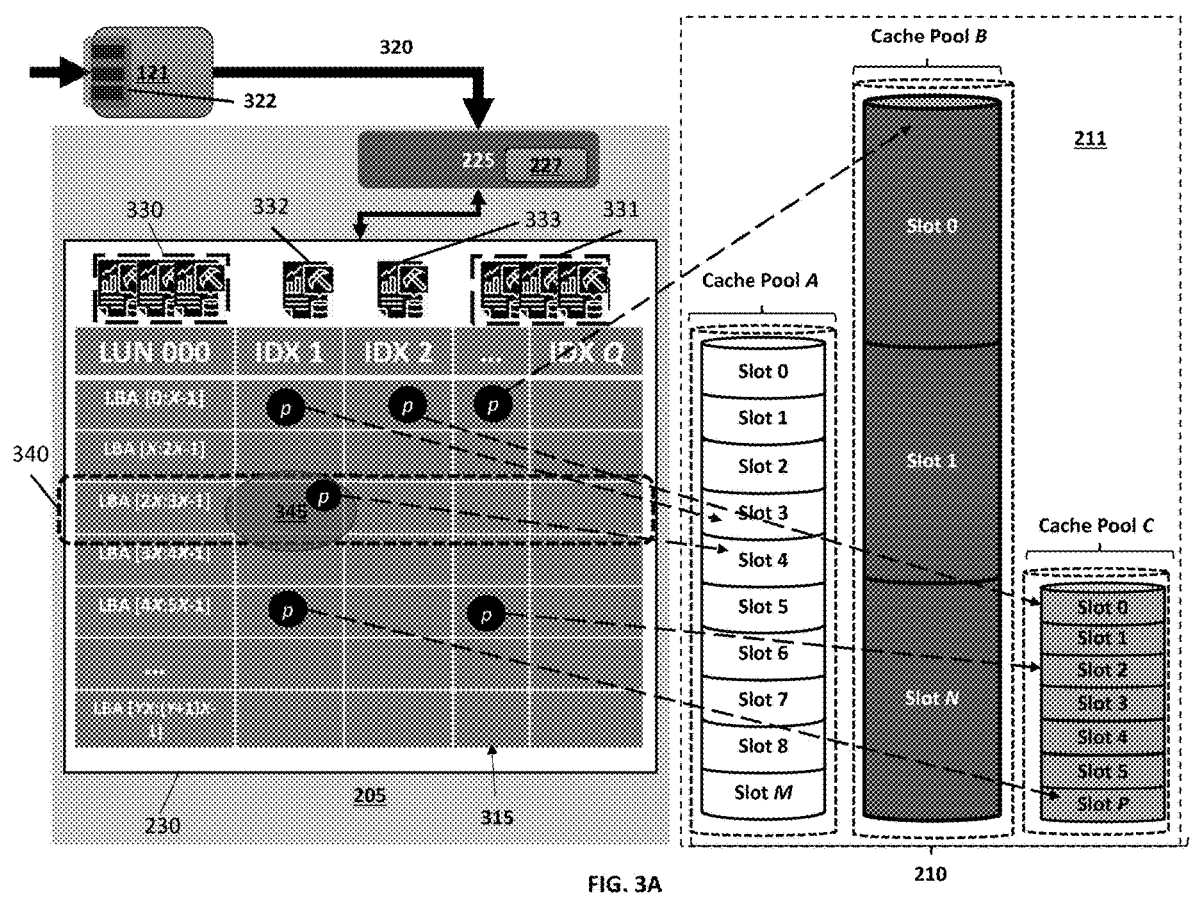
FIG. 3A is a block diagram of a memory management system in accordance with embodiments of the present disclosure.

Regarding FIG. 3A, the array's memory controller 205 can include a memory processor 225 that dynamically allocates or balances each of the cache slot pool's cache slots using a searchable IO routing data structure 315. For example, the IO routing data structure 315 can associate at least one LBA (e.g., LBA 345) of an LBA group 340 with its allocated cache slot (e.g., cache slot 4 of cache pool A). In embodiments, the IO routing data structure can include LBA records with reference pointers 'p' pointing to its allocated cache slot's physical address space.

In embodiments, the memory processor 225 can have a memory balancing machine learning (ML) engine 227 (MLB engine) that generates one or more cache slot balancing models 333. For instance, the MLB engine 227 can have a self-learning logic or circuitry architecture that processes the predictive IO workload models 330 and the predictive IO memory access models 331 to generate one or more cache slot balancing models 333. Further, the MLB engine's architecture can process one or more IO-related parameters (e.g., IO size) with the HA's port 322 that received each parameter's related host-originated IO request. Thus, the MLB engine 227 can read at least one IO-related parameter and related receiving ports (e.g., one of the ports 322) to generate the cache slot balancing models 333.

Further, the cache slot balancing models 333 can define cache slot balancing rules the memory processor 225 uses to allocate one or more of each cache pool's slots (e.g., slots 0-M, slots 0-N, or slots 0-P) per boards B1-n. As such, the memory processor 225 can, advantageously, dynamically balance the cache slots such that each of the array's board's B1-n can locally process IO requests. For example, the cache slot balancing models 333 define balancing policies. The policies can include instructions for each board to record their received IO requests. As a result, the processor 225 can verify the workload model predictions' accuracy and adjust them as needed. In addition, the balancing policies can ensure that LBA to cache slot allocations use the anticipated receiving board's local memory (e.g., memory 300a-n— 301a-n). In addition, the MLB engine 227 can generate the balancing models 333 to have policies that define logical cache slots, including a plurality of smaller-sized cache slots. Specifically, the ML engine 227 can create such balancing models based on the anticipated frequencies of IO request sizes.

For example, suppose a storage array 105 receives an 88 KB IO request. Current naïve techniques would allocate 128 KB cache slots to service the 88 KB IO request. However, the only commercially available cache memory with the closest matching cache slots are 128 KB cache slots and 64 KB cache slots. In such circumstances, the current naïve methods inefficiently utilize 40 KB of cache memory to allocate a 12 KB cache slot to service the 88 KB IO request.

Accordingly, the embodiments disclosed herein, advantageously, increase 10 response times by avoiding routing an IO request to a remote board with the IO request's related cache slot. Further, the balancing policies can include policies that allow the memory processor 225 to dynamically allocate or reallocate the distinctly sized cache slots 0-M, slots 0-N, or slots 0-P from any cache pools A-B.

For instance, suppose cache slot pool A has 16 KB cache slots 0-M; cache slot pool B has 64 KB cache slots 0-N, and cache slot pool C has 8 KB cache slots 0-P. In addition, suppose one or more of the balancing models 333 predicts that one of the boards B1-n should receive a large quantity of host-originated 88 KB IO requests. Then, the balancing models 333 can dynamically define a logical 88 KB cache slot using, e.g., cache slot 3 from cache pool A, cache slot 0 from cache pool B, cache slot 0 from cache pool C.

In embodiments, the memory processor 225 can further bind cache slots to their assigned LBA using the routing data structure 315. In addition, the routing data structure 315 can include an array of cache slot references. For example, the processor 225 can reference each LUN corresponding to the array's storage devices 116a-n. Further, the processor 225 can reference each LUN's related logical block addresses (LBA) in the data structure 315. Additionally, the processor 225 can group each LBA according to their assigned LBA range bucket in the data structure 315 (e.g., LBA [2X:3X-1] of data structure 315). The data structure 315 can also include an array of cache slot pointers 'p' for each LBA bucket range that identifies each LBA's allocated cache slot. As such, the processor 225 can determine which LBAs include a cache slot pointer to generate a table (not shown) that identifies the array's cache slots and their respective status (e.g., bound or available). For example, the table can use a cache status flag or a bitmask to represent each cache slot's status.

Figure 3B:
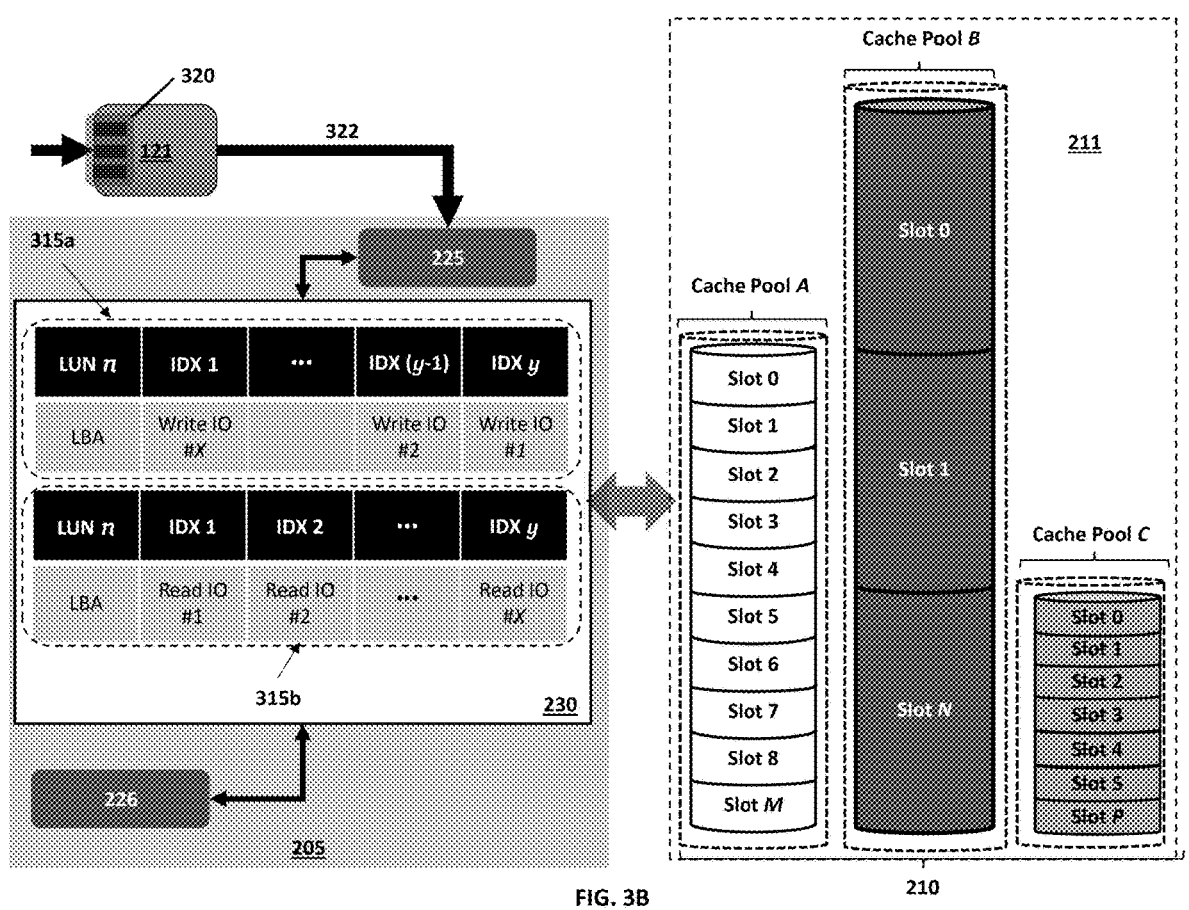
FIG. 3B is a block diagram of a cache memory control system in accordance with embodiments of the present disclosure.

Regarding FIG. 3B, a memory processor 225 can generate an array of cache slot pointers 315a-b that maps an LBA to its allocated cache slot. In embodiments, the processor 225 can add cache slot-to-LBA references using a caching scheme (e.g., ordering scheme) configured to enable fast searches. For example, the processor 225 can establish the caching scheme to efficiently identify at least one of 'dirty' data and the newest version of data for each LBA group (e.g., LBA group 340 of FIG. 3A). For example, 'dirty' data can correspond to cached data that does not include a persistent copy stored on one or more of the array's storage drives 116a-n. Using the caching scheme, the processor 225 can obtain search results much faster than a typical data entry scheme such as a timestamp or version ordering scheme.

In embodiments, a caching scheme stored in the memory controller's local memory 230 can include instructions, causing processor 225 to store cache pointers using a dirty data write-back caching scheme. In embodiments, the dirty data write-back caching scheme can allocate a newly received write IO's data to an LBA bucket range (e.g., range 340 of FIG. 3A) using a right-to-left dirty data ordering scheme. For example, a first new write IO's dirty data can be stored in an LBA bucket's last logically positioned LBA index (e.g., IDX y of the cache pointer array 315a). Further, a subsequently received second new write IO's dirty data can be stored using the LBA index with a logical position immediately to the left of the last logical LBA (e.g., IDX (y−1) of the cache pointer array 315a).

Further, the caching scheme can also include instructions for storing non-dirty data. Specifically, the non-dirty data can correspond to an IO request's target data having a persistent copy stored in one or more of the array's storage drives 116a-n. In embodiments, the non-dirty data caching scheme can be stored using an order-agnostic scheme (i.e., without regard to a cache slot or LBA allocation order). In other examples, the non-dirty data caching scheme can have a caching-order scheme positionally opposite the dirty data caching scheme. For instance, the non-dirty data caching scheme can store non-dirty data using a left-to-right caching scheme. Specifically, the processor 225 can allocate cache slots and LBAs to an LBA bucket's left-most positioned unused LBA index. For example, a first newly received 10 request's related non-dirty data can be placed in IDX 1 of cache pointer array 315b. Additionally, a subsequent second newly received IO request's non-dirty data can be placed in IDX 2 of the pointer array 315b.

In embodiments, the memory controller 205 can include a data controller 326 that performs one or more data validation/correctness operations. For example, a single cache pointer array (e.g., pointer array 315a-b) can store references for dirty data and non-dirty data. For example, suppose the array 101 receives a new write IO with dirty data and the pointer array 315a is full (e.g., each LBA index includes a cache pointer reference). Then, the data controller 326 can perform a cache eviction operation in this circumstance.

For instance, the data controller 326 can identify any non-dirty data allocated LBA index positioned to the left of a left-most positioned dirty data allocated LBA index. Further, the data controller 326 can free the identified non-dirty data allocated LBA index for the new write IO's dirty data. Specifically, the data controller 326 can evict or eject the cache slot allocated to the non-dirty data LBA index and remote its cache pointer reference.

Another cache eviction operation can include appending the new write IO's dirty data to an existing left-most dirty data allocated LBA index. For example, the data controller 326 can determine the storage requirements of the new write IO's dirty data information, e.g., the write data, IO metadata, cache pointers, and the like. Further, the data controller 326 can compare the write IO's storage requirements to the LBA index's available storage capacity. Thus, the data controller 326 can append the write IO's dirty data information to the existing dirty-data LBA index if there is available capacity. In further examples, the data controller 326 can collapse a set of allocated dirty data LBA indices into a larger cache slot/LBA index to free one or more of the LBA bucket's indices. Accordingly, the data controller 326 can store the new write IO's dirty data in a freed LBA index.

In embodiments, the processor 225 can insert a data type flag or bitmask reference upon storing non-dirty or dirty data in an LBA bucket's index. Thus, the processor 225 can determine whether an allocated LBA index corresponds to dirty or non-dirty data using the data type flag or bitmask. Further, the processor 225 can search the cache pointer arrays 315*a-b* based on the IO request's target data type in response to receiving a new IO request.

In embodiments, the data controller 226 can perform quick and resource-efficient searches of the IO routing table's pointer arrays 315*a-b* by comparing an IO's target data type with the caching schemes stored in the controller's local memory 230. For example, the data controller 226 can determine whether the IO request corresponds to dirty or non-dirty data based on the IP type. Specifically, the data controller 226 can flag read IO's target data as non-dirty data and write IO's target data as dirty data. Then, based on the IO-target data type, the data controller 226 can use the dirty data or non-dirty data caching order scheme to search the IO routing table 315. For example, the data controller 226 can use a left-to-right searching scheme for non-dirty IO-target data types and a left-to-right searching scheme for dirty IO-target data types.

The following text includes details of one or more methods or flow diagrams in accordance with this disclosure. For simplicity of explanation, the methods are depicted and described as a series of acts. However, acts in accordance with this disclosure can occur in various orders or concurrently and with other acts not presented and described herein. Furthermore, not all illustrated acts may be required to implement the disclosed methods related to the embodiments of this disclosure's subject matter.

Figure 4:
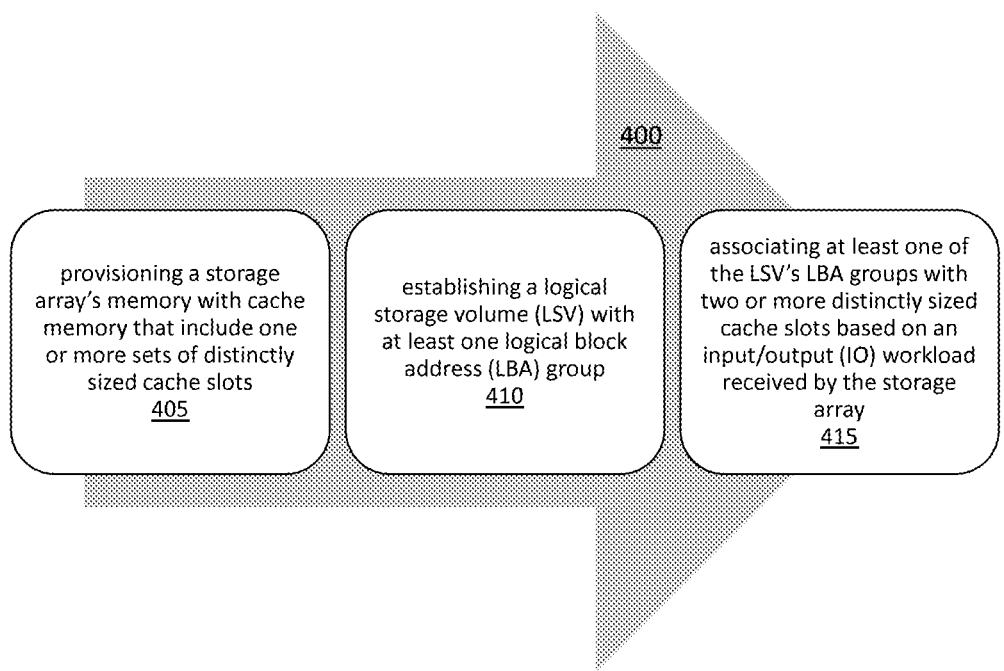
FIG. 4 is a flow diagram of a method for managing cache memory in accordance with embodiments of the present disclosure.

Regarding FIG. 4, a method 400 can be executed by any of the array's other components (e.g., components 101 of FIG. 1). The method 400 describes techniques for data cache management. At 405, the method 400 can include provisioning a storage array's memory with cache memory. The cache memory can comprise one or more sets of distinctly sized cache slots. The method 400, at 410, can also include establishing a logical storage volume (LSV) with at least one logical block address (LBA) group. At 415, the method 400 can further include associating at least one of the LSV's LBA groups with two or more distinctly sized cache slots based on an input/output (IO) workload received by the storage array. It should be noted that each step of the method 400 can include any combination of techniques implemented by the embodiments described herein.

Figure 5:
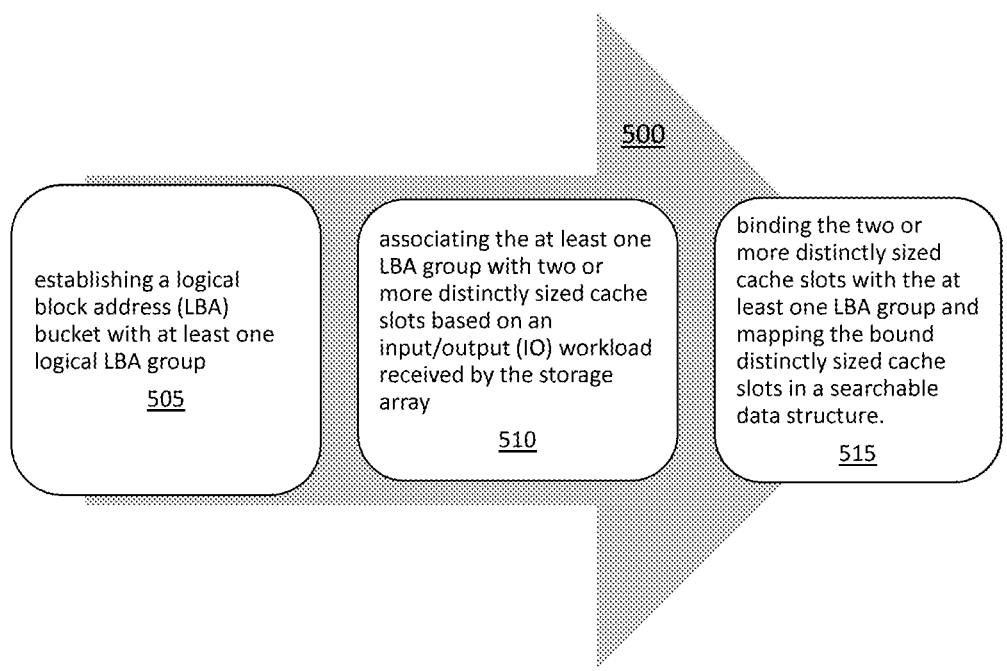
FIG. 5 is a flow diagram of a method for ordering cache memory allocations in accordance with embodiments of the present disclosure.

Regarding FIG. 5, a method 500 can be executed by any of the array's other components (e.g., components 101 of FIG. 1). The method 500 describes techniques for data cache management. At 505, the method 500 can include establishing a logical block address (LBA) bucket with at least one logical LBA group. The method 500, at 510, can also include associating at least one LBA group with two or more distinctly sized cache slots based on an input/output (IO) workload received by the storage array. At 515, the method 400 can further include performing the association by binding the two or more distinctly sized cache slots with the at least one LBA group and mapping the bound distinctly sized cache slots in a searchable data structure. The data structure can identify relationships between slot pointers and key metadata. It should be noted that each step of the method 400 can include any combination of techniques implemented by the embodiments described herein.

A skilled artisan can implement the above-described systems and methods in digital electronic circuitry, computer hardware, firmware, or software using the teachings disclosed herein. The implementation can be as a computer program product. The implementation can, for example, be in a machine-readable storage device for execution by or to control the operation of, data processing apparatus. The implementation can, for example, be a programmable processor, a computer, or multiple computers.

A computer program can be in any programming language, including compiled or interpreted languages. The computer program can have any deployed form, including a stand-alone program or subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implement that functionality.

Processors suitable for executing a computer program include, by way of example, both general and special purpose microprocessors and any one or more processors of any digital computer. Generally, a processor receives instructions and data from a read-only memory, a random-access memory, or both. Thus, a computer's essential elements can include a processor that executes instructions that one or more memory devices store. Generally, a computer can include, can be operatively coupled to receive data from or transfer data to one or more mass storage devices for storing data (e.g., magnetic, magneto-optical disks, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated in special purpose logic circuitry.

A computer having a display device that enables user interaction can implement the above-described techniques. The display device can, for example, be a cathode ray tube (CRT) or a liquid crystal display (LCD) monitor. For example, a display can present information to the user, and the user can interact with the computer via a keyboard and a pointing device (e.g., a mouse or a trackball). In addition, the user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication networks include a local area network (LAN), a wide area network (WAN), the Internet, wired networks, or wireless networks.

The system can include clients and servers. A client and a remote server can interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), or other packet-based networks. Circuit-based networks can include, for example, a public switched telephone network (PSTN), a private branch exchange (PBX), a wireless network, or other circuit-based networks. Finally, wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

The terms "comprise," "include," and "or" are open-ended, include the listed parts, and contain additional elements that are not listed. Additionally, the term "or" is open-ended and includes one or more of the listed parts and combinations of the listed features.

One skilled in the art will realize that other specific forms can embody the concepts described herein without departing from their spirit or essential characteristics. Therefore, in all respects, the preceding embodiments are illustrative rather than limiting the concepts described herein. The appended claims thus recite the scope of this disclosure. Therefore, all changes embrace the meaning and range of equivalency of the claims.

What is claimed is:

1. A method comprising:
establishing a logical block address (LBA) bucket with at least one LBA group; and
associating the at least one LBA group with two or more distinctly sized cache slots based on an input/output (IO) workload received by a storage array, wherein the association includes:
binding the two or more distinctly sized cache slots with the at least one LBA group, and
mapping the bound distinctly sized cache slots in a searchable data structure, wherein the searchable data structure identifies relationships between slot pointers and key metadata.

2. The method of claim 1, further comprising:
identifying any of the IO workload's related IO requests that include dirty data payloads.

3. The method of claim 1, further comprising:
determining whether the storage array has previously stored a version of an IO request's data payload on a persistent storage device; and
identifying each data payload without a previously stored version as dirty data.

4. The method of claim 3, further comprising:
configuring the searchable data structure to store dirty data using an ordering schema that positionally identifies a newest write IO request's dirty data.

5. The method of claim 4, further comprising:
configuring the searchable data structure to store non-dirty data that stores the write IO request's non-dirty data using a storage schema that is at least one of: positionally opposite to dirty data and unordered.

6. The method of claim 5, further comprising:
configuring a data search schema based on an ordering scheme of the dirty data.

7. The method of claim 6, further comprising:
performing a search to determine whether a newly receiving IO request's data is dirty or non-dirty using the data search schema.

8. The method of claim 1, further comprising:
generating an initial storage array resource profile based on the storage array's intended use characteristics; and
provisioning cache memory with one or more sets of distinctly sized cache slots using the initial storage array resource profile.

9. The method of claim 8, further comprising
establishing one or more cache slot pools based on attributes of the cache memory's corresponding cache slots and current/historical IO workloads received by the storage array.

10. The method of claim 9, further comprising:
identifying one or more IO workload patterns based on characteristics of a IO workload's corresponding IO requests;

establishing one or more IO workload models based on the one or more IO workload patterns; and establishing one or more cache slot pools based on predicted IO request characteristics defined by the one or more IO workload models and each cache slot's memory type.

11. An apparatus having a memory and processor configured to:

establish a logical block address (LBA) bucket with at least one LBA group; and associate the at least one LBA group with two or more distinctly sized cache slots based on an input/output (IO) workload received by a storage array, wherein the association includes:

binding the two or more distinctly sized cache slots with the at least one LBA group, and mapping the bound distinctly sized cache slots in a searchable data structure, wherein the searchable data structure identifies relationships between slot pointers and key metadata.

12. The apparatus of claim 11, further configured to:
identify any of the IO workload's related IO requests that include dirty data payloads.

13. The apparatus of claim 11, further configured to:
determine whether the storage array has previously stored a version of an IO request's data payload on a persistent storage device; and identify each data payload without a previously stored version as dirty data.

14. The apparatus of claim 13, further configured to:
configure the searchable data structure to store dirty data using an ordering schema that positionally identifies a newest write IO request's dirty data.

15. The apparatus of claim 14, further configured to:
configure the searchable data structure to store non-dirty data that stores the write IO request's non-dirty data using a storage schema that is at least one of:
positionally opposite to dirty data and unordered.

16. The apparatus of claim 15, further configured to:
configure a data search schema based on an ordering scheme of the dirty data.

17. The apparatus of claim 16, further configured to:
perform a search to determine whether a newly receiving IO request's data is dirty or non-dirty using the data search schema.

18. The apparatus of claim 11, further configured to:
generate an initial storage array resource profile based on the storage array's intended use characteristics; and provision cache memory with one or more sets of distinctly sized cache slots using the initial storage array resource profile.

19. The apparatus of claim 18, further configured to
establish one or more cache slot pools based on attributes of the cache memory's corresponding cache slots and current/historical IO workloads received by the storage array.

20. The apparatus of claim 19, further configured to:
identify one or more IO workload patterns based on characteristics of a IO workload's corresponding IO requests;

establish one or more IO workload models based on the identified one or more IO workload patterns; and establish one or more cache slot pools based on predicted IO request characteristics defined by the one or more IO workload models and each cache slot's memory type.

* * * * *